United States Patent
DeJonge

(12) 
(10) Patent No.: US 6,612,194 B2
(45) Date of Patent: Sep. 2, 2003

(54) SHIFTER WITH LOAD SENSORS FOR SENSING SHIFT DEMANDS

(75) Inventor: Robert A. DeJonge, West Olive, MI (US)

(73) Assignee: Grand Haven Stamped Products, division of JSJ Corporation, Grand Haven, MI (US)

( * ) Notice: Subject to any disclaimer, the term of this patent is extended or adjusted under 35 U.S.C. 154(b) by 49 days.

(21) Appl. No.: 09/820,043

(22) Filed: Mar. 28, 2001

(65) Prior Publication Data

US 2002/0139212 A1 Oct. 3, 2002

(51) Int. Cl.[7] ............................................. F16H 63/00
(52) U.S. Cl. ....................................................... 74/335
(58) Field of Search ............................... 74/335, 473.12, 74/473.18, 523, 545, 357; 192/218; 477/94, 96

(56) References Cited

U.S. PATENT DOCUMENTS

| | | |
|---|---|---|
| 5,167,308 A | 12/1992 | Osborn |
| 5,211,271 A | 5/1993 | Osborn et al. |
| 5,293,900 A * | 3/1994 | Karbassi et al. ............ 315/364 |
| 5,884,528 A * | 3/1999 | Ludanek et al. ........... 116/28.1 |
| 5,884,529 A * | 3/1999 | Meyer ..................... 74/473.18 |
| 6,411,879 B2 * | 6/2002 | Kupper et al. .............. 180/337 |

* cited by examiner

Primary Examiner—Christopher P. Schwartz
Assistant Examiner—Melanie Torres
(74) Attorney, Agent, or Firm—Price Heneveld Cooper DeWitt & Litton

(57) ABSTRACT

A shifter includes a base and a driver interface module, such as a lever or knob, having a structural member attached to the base and held in a fixed position so that a handle on the structural member can be grasped and loaded by a vehicle operator. At least one load-measuring sensor, such as a strain gage, is attached to the structural member. The sensor outputs an analog signal in proportion to the load applied to the structural member by the vehicle operator. A circuit is connected to the load-measuring sensor for receiving the analog signal. The circuit is configured and programmed to output a transmission-shift control signal when the shift request signal reaches a predetermined minimum load value.

16 Claims, 6 Drawing Sheets

SHIFTER WITH LOAD SENSORS FOR SENSING SHIFT DEMANDS

BACKGROUND OF THE INVENTION

The present invention relates to shifters for vehicle transmissions, and more particularly relates to shifters with sensors that generate signals to control shifting of the vehicle transmissions.

Many passenger vehicles have floor-mounted transmission shifters located between front passenger seats. Preferably, these shifters are optimally located within easy reach of the vehicle driver and are shiftable along a path of gear positions that keep them within that easy reach. A problem occurs as the vehicle passenger compartment becomes smaller, because more and more things in and around the shifter start to interfere with movement of the shifter, especially at ends of the shift path. This problem is exacerbated when the shifter is movable laterally between an automatic fore-aft shift path and a manual fore-aft shift path. For these reasons, a shifter having a decreased shift path is desired.

It is also desirable to provide a shifter that is more directly and instantaneously responsive to a driver's inputs. In particular, a shifter is desired that is adapted to change shift characteristics based on driver inputs. Preferably, the shifter would be immediately responsive to driver induced changes, but the changes would be intuitive and recognized by the driver without substantial explanation and without the need for a substantial learning curve by the driver.

Accordingly, a shifter is desired having the aforementioned advantages and that solves the aforementioned disadvantages.

SUMMARY OF THE PRESENT INVENTION

In one aspect of the present invention, a shifter includes a base, and a driver interface module having a structural member attached to the base and held in a fixed position so that a handle on the structural member can be grasped and loaded by a vehicle operator. At least one load-measuring sensor is attached to the structural member. The sensor outputs an analog signal in proportion to the load applied to the structural member by the vehicle operator. A circuit is connected to the load-measuring sensor for receiving the analog signal. The circuit is configured and programmed to output a transmission-shift control signal when the shift request signal reaches a predetermined minimum load value.

In another aspect of the present invention, a shifter includes a base configured for secure attachment to a vehicle. A driver interface module includes a structural member operably attached to the base and adapted to be grasped by a vehicle operator. The structural member is movable along a first shift path between park, reverse, neutral, and drive gear positions, and further is positionable in a manual shift position where the structural member is characteristically not movable. At least one load-measuring sensor is attached to one of the structural member and the base. The sensor outputs an analog signal when the structural member is in the manual shift position and loaded by the vehicle operator, with the analog signal being proportional to the load applied to the structural member by the vehicle operator. A circuit is connected to the load-measuring sensor for receiving the analog signal. The circuit is configured and programmed to analyze the load application to the structural member with respect to time and control gear change characteristics of the vehicle's transmission in response to that analysis.

In another aspect of the present invention, a shifter includes a base, and a shift lever held in a fixed position on the base so that the shift lever can be grasped and loaded by a vehicle operator. At least one load-measuring sensor is attached to the shift lever. The sensor outputs an analog signal in proportion to the load applied to the shift lever by the vehicle operator. The sensor is adapted for connection to a circuit for receiving the analog signal and for controlling shifting of a transmission based on the analog signal when the analog signal reaches a predetermined minimum load value.

In yet another aspect of the present invention, a method of shifting a vehicle transmission comprises steps of providing a driver interface module held in a fixed position and providing at least one load-measuring sensor attached to the driver interface module, the sensor outputting an analog signal in proportion to a load applied to the driver interface module by the vehicle operator. The method further includes sensing the load applied to the driver interface module and outputting an analog signal, and shifting the vehicle transmission when the analog signal reaches a predetermined minimum value.

In yet another aspect of the present invention, a shifter for shifting a vehicle transmission includes a base defining an arcuate track and defining a virtual pivot axis below the track, and a carrier operably mounted to the arcuate track for movement along the track around the virtual pivot axis. A driver interface module is supported by the carrier and includes an automatic shift mode and a manual shift mode. The driver interface module when in the automatic shift mode has selectable positions corresponding to park, reverse, neutral, and drive gear positions in an automatic transmission, and when in the manual shift mode has at least one position where up-shifting and down-shifting of the automatic transmission can be accomplished manually.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
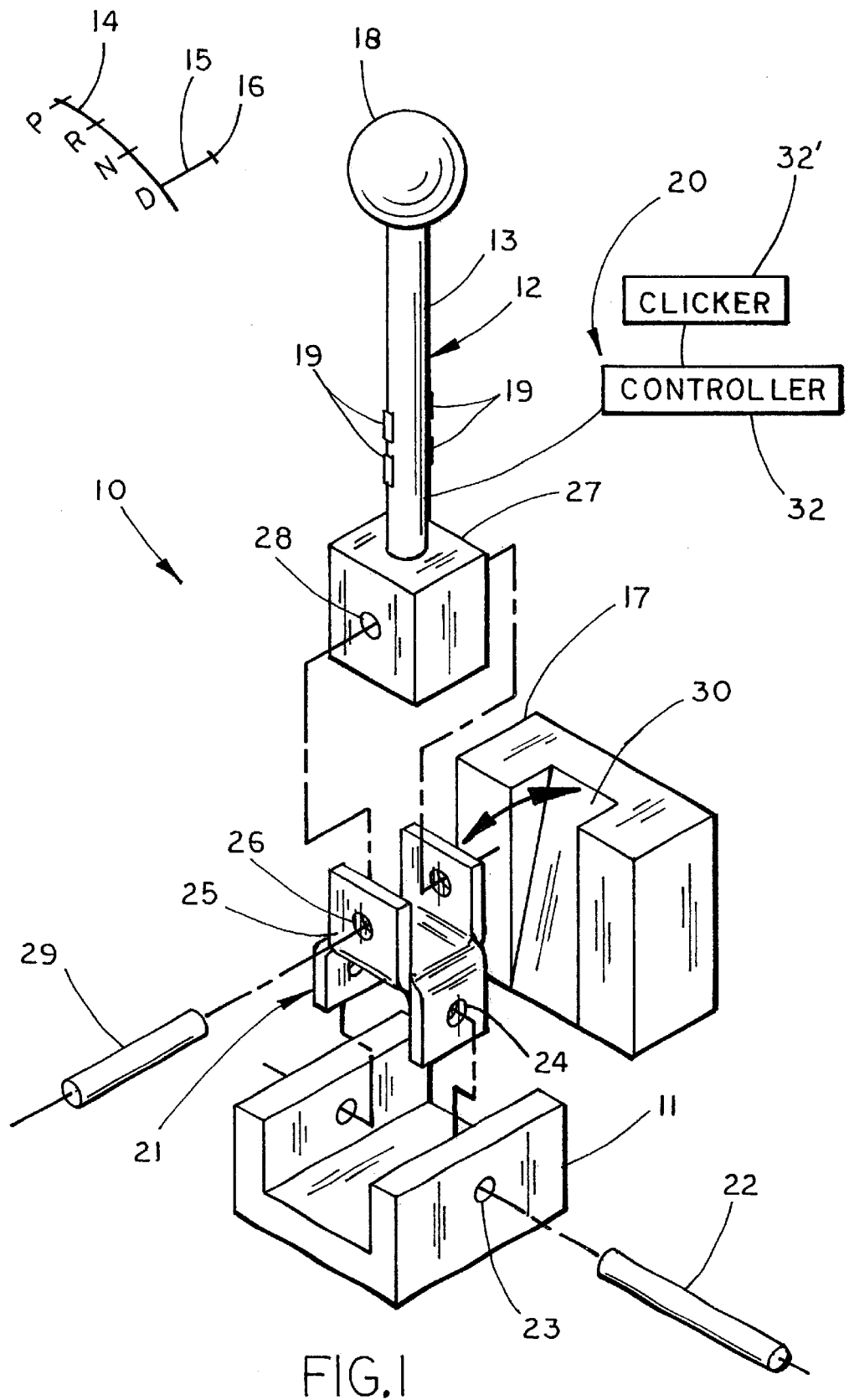
FIG. 1 is an exploded perspective view of a shifter embodying the present invention.

A shifter 10 (FIG. 1) includes a base 11 and a driver interface module, such as the illustrated lever 12, having a structural member or post 13 operably supported on and attached to the base 11. The lever 12 is movable along an automatic shift path 14, and is also movable across a transition path 15 to a manual shift position 16. The lever 12 engages and is held in a fixed position by the anchor or stop member 17 so that a handle 18 on the structural member 13 can be grasped and loaded by a vehicle operator. At least one load-measuring sensor, such as the illustrated set of strain gages 19, is attached to the structural member 13. The sensor 19 outputs an analog signal in proportion to the load applied to the structural member 13 by the vehicle operator. A circuit 20 is connected to the load-measuring sensor 19 for receiving the analog signal. The circuit 20 is configured and programmed to output a transmission-shift control signal when the shift request signal reaches a predetermined minimum load value. Thus, "up" shifting and "down" shifting is accomplished without movement of the lever 12 by the vehicle driver, but instead is accomplished by the vehicle driver placing "fore" and "aft" forces on the shift lever 12 when the shifter 10 is in the manual shift mode at location 16. The "fore and aft" forces on the shift lever 12 define a phantom shift path that extends from location 16 in a direction parallel the automatic shift path 14 (see FIG. 1). The term "phantom" is used because the shift lever 12 does not move from location 16 during a manual upshift or a manual downshift, and thus a "path" only exists in the sense that the vehicle driver inputs forces to the shift lever 12 as if the shift lever is going to move along the phantom shift path even though the shift lever does not move per se.

The shifter 10 (FIG. 1) includes a trunion 21 supported on the base 11 by a pivot pin 22 that engages holes 23 in the base 11 and hole 24 in the trunion 21. The illustrated trunion 21 further includes up flanges 25 that include holes 26. The shift lever 12 includes an enlarged bottom section 27 having a hole 28 for receiving a pivot pin 29 that also engages the holes 26 in the "up" flanges 25. The pivot pins 22 and 29 are orthogonally related. When the shift lever 12 is in the automatic shift path 14, it is movable about the pivot pin 22 between park "P", reverse "R", neutral "N" and drive "D" gear positions. When the shift lever 12 is moved laterally across the transition path 15 about pivot pin 29, the shift lever 12 comes to a stop in the manual shift position 16. In the manual shift position 16, the trunion 21 has moved into a notch 30 in the stationary stop member 17. The notch 30 prevents the shift lever 12 from moving about pivot pin 22 in a fore-to-aft direction while the shift lever 12 is in the manual shift position 16. Nonetheless, the driver can still input "up" and "down" shifts by pushing or pulling on the shift lever 12, since this results in loading of the shift lever 12 in a manner that is sensed by the strain gages 19. As a result of the loading, the strain gages 19 output an analog signal to a controller 32 in the circuit 20. When a predetermined minimum load value is received, the circuit 20 outputs a transmission-shift control signal to the transmission, causing the transmission to upshift or downshift corresponding to the strain gage signal received.

It is recognized that the shift lever 12 can have some slight movement when in the manual shift position 16 due to clearances provided in the assembled components and/or due to wear of components and/or due to the force applied by the vehicle driver which results in bending or compressing of components. Nonetheless, it is intended that (and it should be understood by a person of ordinary skill that) such slight movements are to be considered as being included in or covered by the terms "fixed" or "not movable" as defined in the claims hereafter.

Figure 2:
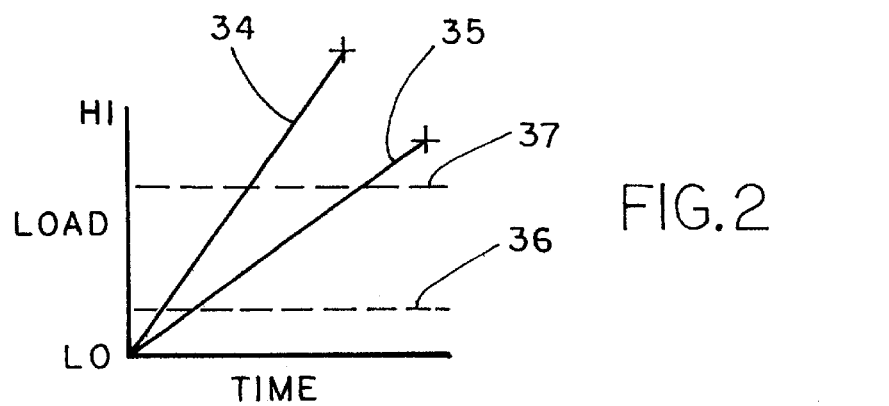
FIG. 2 is a time vs. force curve showing forces generated on the shifter of FIG. 1 during a shift sequence.

It is contemplated that the controller 32 can be programmed with a look-up table or other memory or to a reference equation, so that different transmission-shift control signals can be output depending upon the maximum load sensed by the sensors (i.e. the driver has pulled hard on the lever 12 to demand a hard shift as shown by line 34 in FIG. 2 or has only pulled lightly on the lever 12 to demand a soft shift as shown by line 35 in FIG. 2). Also, the controller 32 can be programmed with a look-up table or other memory, so that different transmission-shift control signals can be output depending upon the quickness or rate of increase of the load sensed by the sensors (i.e. the driver has pulled sharply on the lever 12 to demand a fast and hard shift as shown by short time of the portion of line 34 between the dashed lines 36 and 37, or the driver has pulled slowly on the lever 12 to demand a slower and smoother shift as shown by longer time of the portion of line 35 between the dashed lines 36 and 37). It is further contemplated that a clicker 32' or other noise generator or chime or (light source) will be attached to the circuit of controller 32 for generating audible (or other) feedback to indicate to the operator that the shift request has been accepted and will occur (or is occurring). The idea of audible feedback is to reinforce the absence of perceived movement of the shift lever or knob with a sound, letting the driver know the shift system has recognized the command input.

Figure 3:
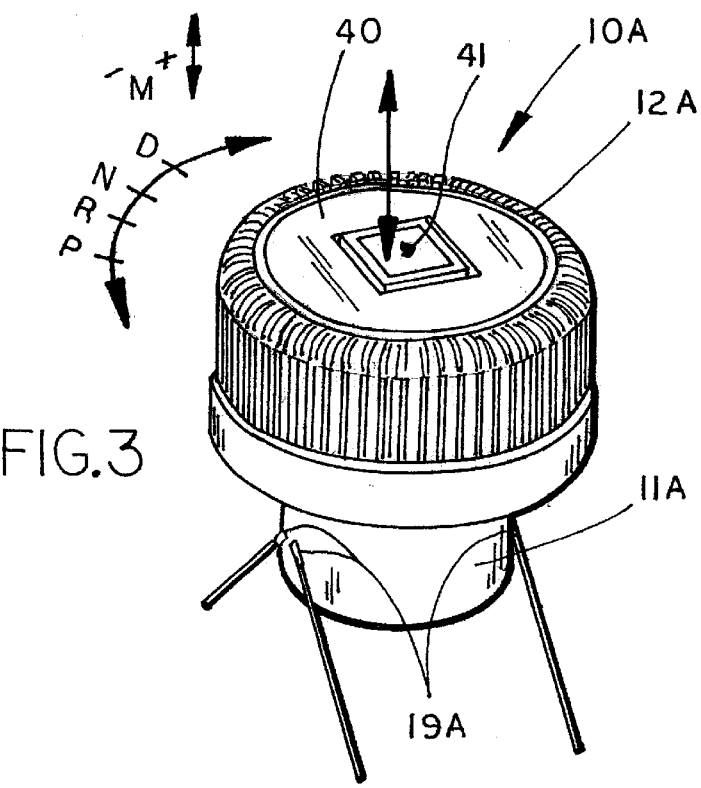
FIGS. 3 and 3A are perspective schematic views of modified shifters.
Figure 3A:
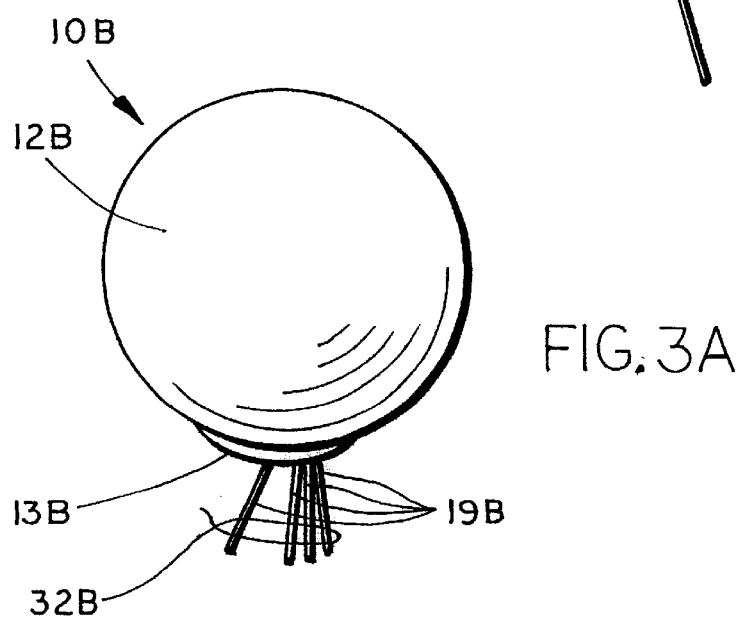

It is contemplated that the shifter can be supported in a variety of different ways and still be within a scope of the present invention. Further, it is contemplated that a variety of different shifters can incorporate the present inventive concepts and still be within a scope of the present invention. For example, FIG. 3 shows a shifter 10A having a rotatable knob 12A supported on a base 11A. The knob 12A is rotatable between different gear positions P, R, N, and D. By pressing a center button 40 (or by pressing another button somewhere around the shifter), the knob 12A is held temporarily in a manual shift position. The gear position and/or the manual or automatic shift mode are displayed by display 41. When in the manual shift position, the knob 12A is held stationary, but strain gages 19A are positioned to sense loading of the knob 12A in "up" and "down" rotational directions to request "up" and "down" shifting of the vehicle transmission. By pressing a center button 40 a second time, the knob 12A is released to the automatic shift path for rotation between P, R, N, and D positions. FIG. 3A shows yet another example, where a shifter 10B includes a sphere or ball/handle 12B mounted on a post 13B in a joy-stick-like arrangement. In shifter 10B, sensors 19B are used inside the ball/handle 12B to sense loading of the post 13B in orthogonal and/or rotational directions and wires 32B connect strain gages 19B to a controller programmed to shift the vehicle transmission.

Figure 4:
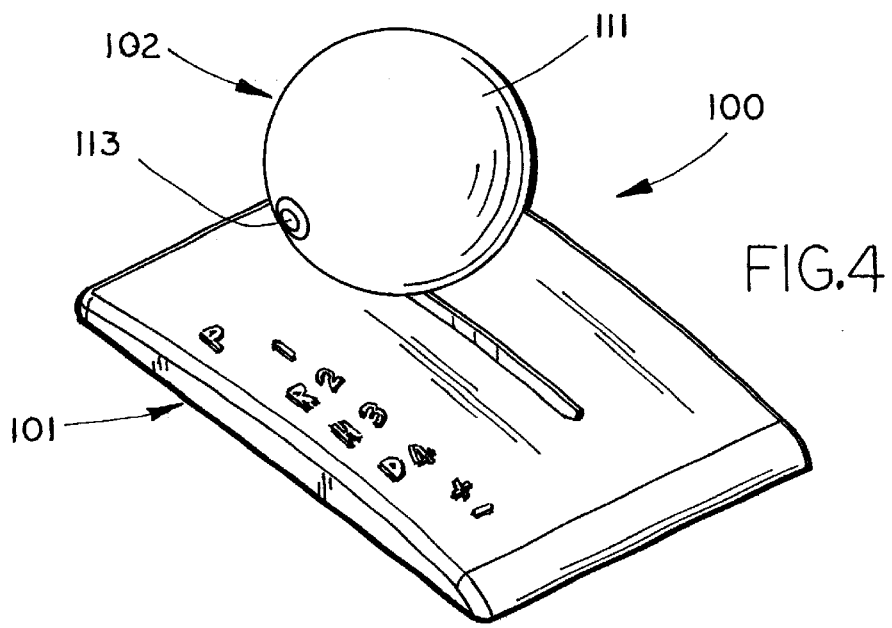
FIGS. 4–5 are perspective and side views of a third modified shifter.
Figure 5:
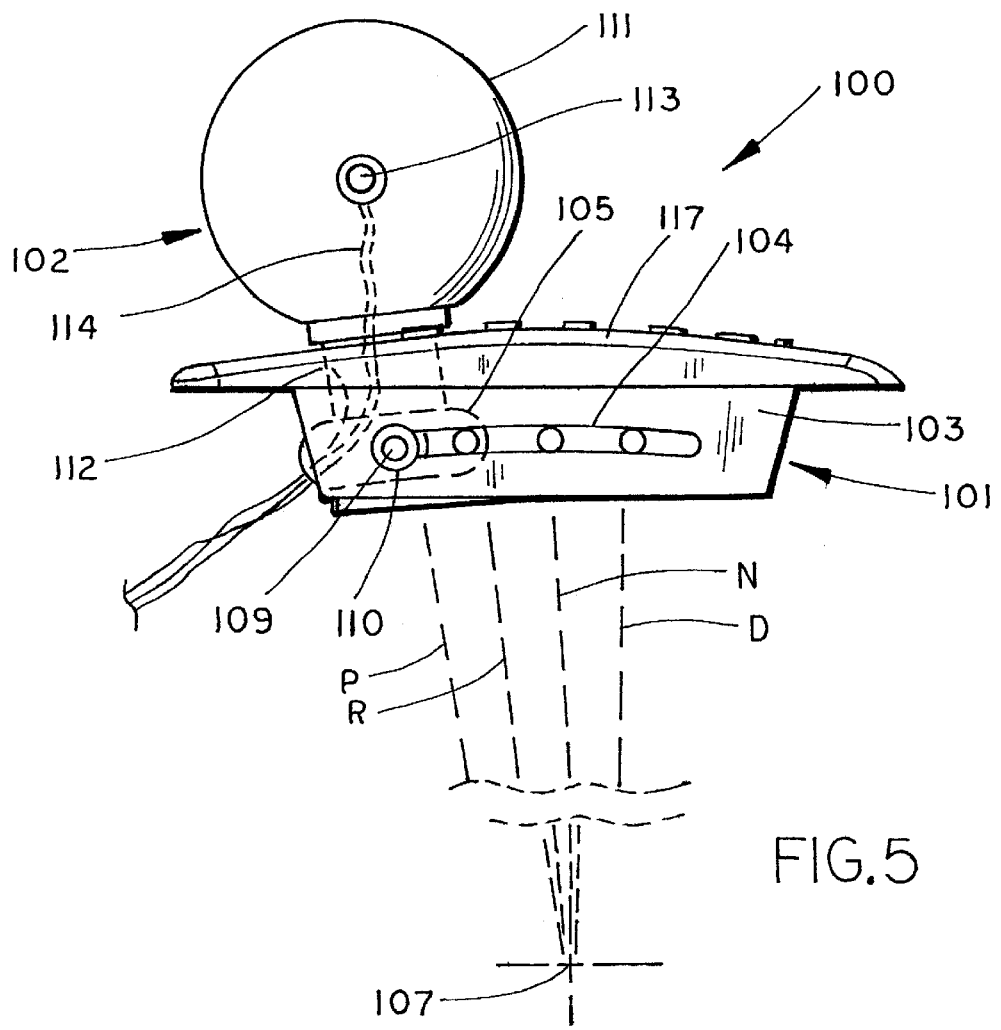
Figure 6:
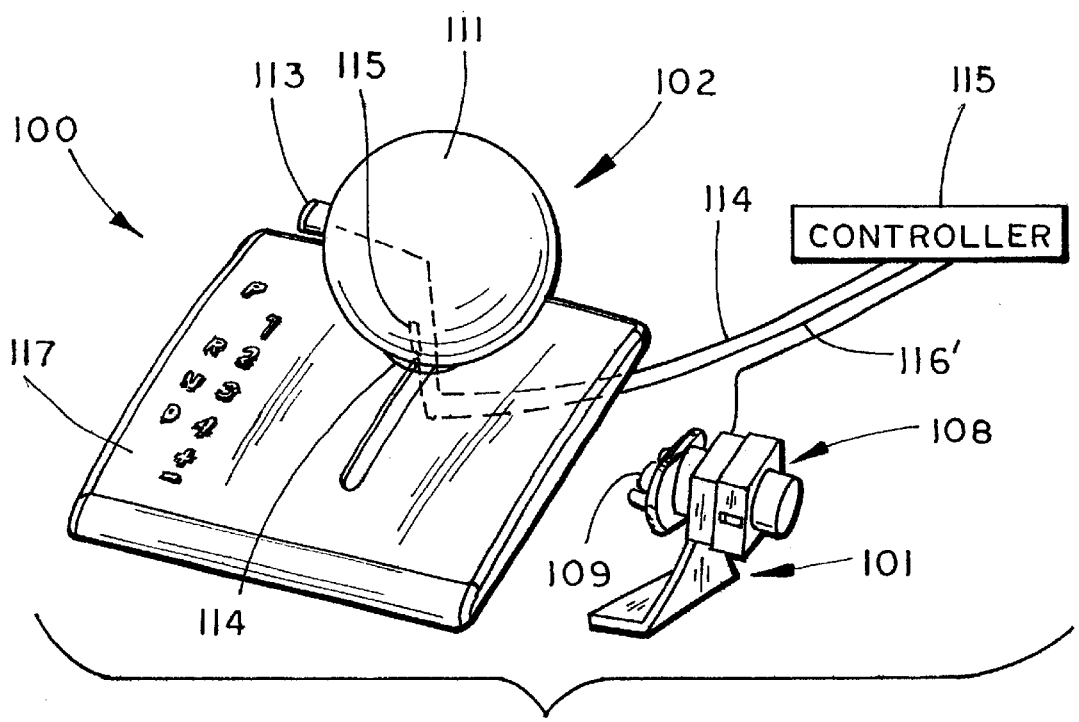
FIG. 6 is a partially exploded perspective view of the shifter in FIG. 4.
Figure 7:
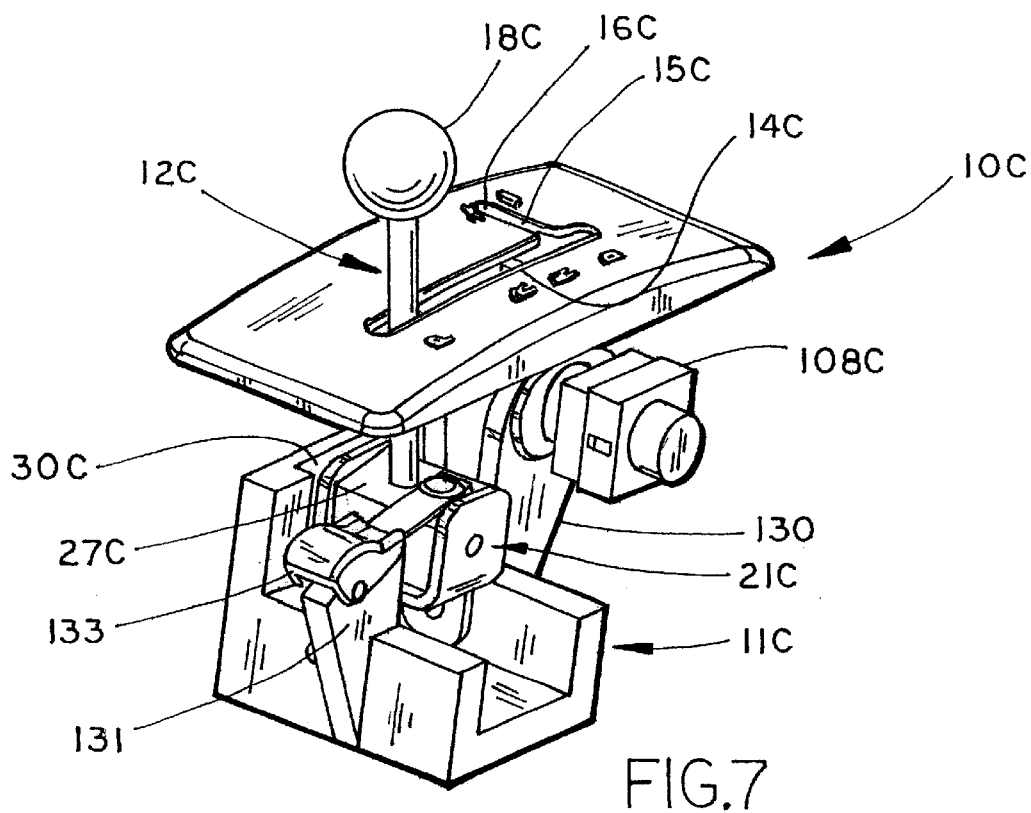
FIG. 7 is a perspective view of a fourth modified shifter.
Figure 8:
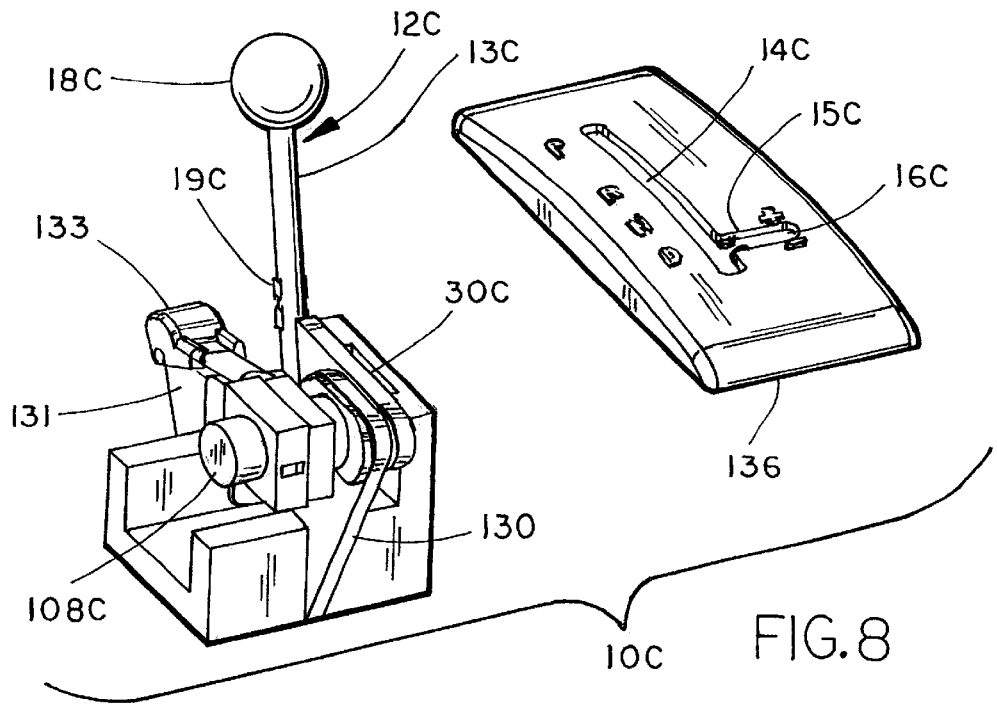
FIGS. 8–10 are exploded perspective views of the shifter of FIG. 7.

FIGS. 4–6 show a modified shifter 100 having a base 101 (FIG. 5) and shift lever 102. The base 101 includes sidewalls 103 defining an inverted arcuate slotted track 104. A shift lever carrier 105 includes rollers or bearings that slidably engage the track 104 to operatively carry the shift lever 102 along an arcuate path about a virtual pivot point 107. The shift path includes shift positions park "P", reverse "R", neutral "N", and drive "D". A solenoid or other electromechanical device 108 (FIG. 6) having an extendable pin 109 is located adjacent the drive position "D". (See FIG. 6.) The carrier 105 (FIG. 5) includes a hole 110 positioned for engagement by the extendable pin 109 (FIG. 6) when the carrier 105 is in the park position "P". The shift lever 102 includes a handle 111 supported by a post 112 on the carrier 105. A button 113 on the handle 111 includes wires 114 (FIG. 5) connecting the button 113 to a controller 115 (FIG. 6), and strain gages 116 on the post 112 include wires 116' connecting the strain gages 116 to the controller 115. The controller 115 is also connected to a lighting device for selectively illuminating the row of shift position indicators P, R, N, D and/or the row of indicators 1, 2, 3, 4 and/or the row of indicators "+" and "−" on the cover 117 that covers the base 101.

The shifter 100 is programmed for operation in an automatic shift mode where gear positions P, R, N, and D can be selected by movement of the shift lever to a specific location, and further is programmed for operation in a manual shift mode where gear positions 1, 2, 3 and 4 can be selected by upshifting and downshifting movement of the shift lever. Initially, the vehicle driver presses on a vehicle brake with the vehicle ignition on and the vehicle motor started. This retracts pin 109 and releases the shift lever 102 for movement along the automatic shift mode positions P, R, N, D. (It is noted that the extendable pin 109 and solenoid 108 can be programmed to provide a park lock function as well as the manual mode locking function described below.) When the shift lever 102 is moved to the drive position "D", the vehicle is programmed to automatically shift between transmission first, second, third, and fourth forward drive gear positions as is well known in the industry. However, when the button 113 is depressed, the extendable pin 109 is extended into the hole 110, locking the carrier 105 and shift lever 102 in a stationary position and signaling to the controller 115 to switch to the manual shift mode. In the manual shift mode, when the vehicle driver presses forward on the shift lever 102, the shift lever 102 cannot move since it is held by pin 109. Nonetheless, the strain gages 116 generate an analog signal that is communicated to the controller 115. When the analog signal reaches a desired preset level (i.e. when the driver has pushed hard and long enough on the sift lever), the controller downshifts. Also, when the vehicle driver pulls rearward on the shift lever 102, the strain gages 116 generate an analog signal that is communicated to the controller 115 causing an upshift.

A significant aspect of the present invention is that the sensor(s) output an analog signal which is analyzed and used to control transmission shifting. In one aspect, the signal is differentiated with respect to time and the gear change is effected based on that data. The idea is that a vehicle driver will subconsciously put more load into the shift member in a much shorter time in a high-stress situation or whenever he or she wants or needs a much shorter and quicker/harsher gear change. (Compare lines 34 and 35 in FIG. 2.) The spike in the load versus time graph can be detected by the controller, and in turn, the controller can respond by altering the gear change in a pre-programmed manner to shift faster (or slower). Notably, it is contemplated that one strain gage can be used to measure loads in two opposite directions, or alternatively one (or more) strain gage(s) can be used to monitor the loads in each of the opposite directions. It is contemplated that the need for the side movement of the shifter (see FIG. 1) can be eliminated by using a transversely oriented strain gage that senses a side load (in a cross-car direction) to indicate a driver is changing from the automatic shift mode to the manual shift mode.

Figure 9:
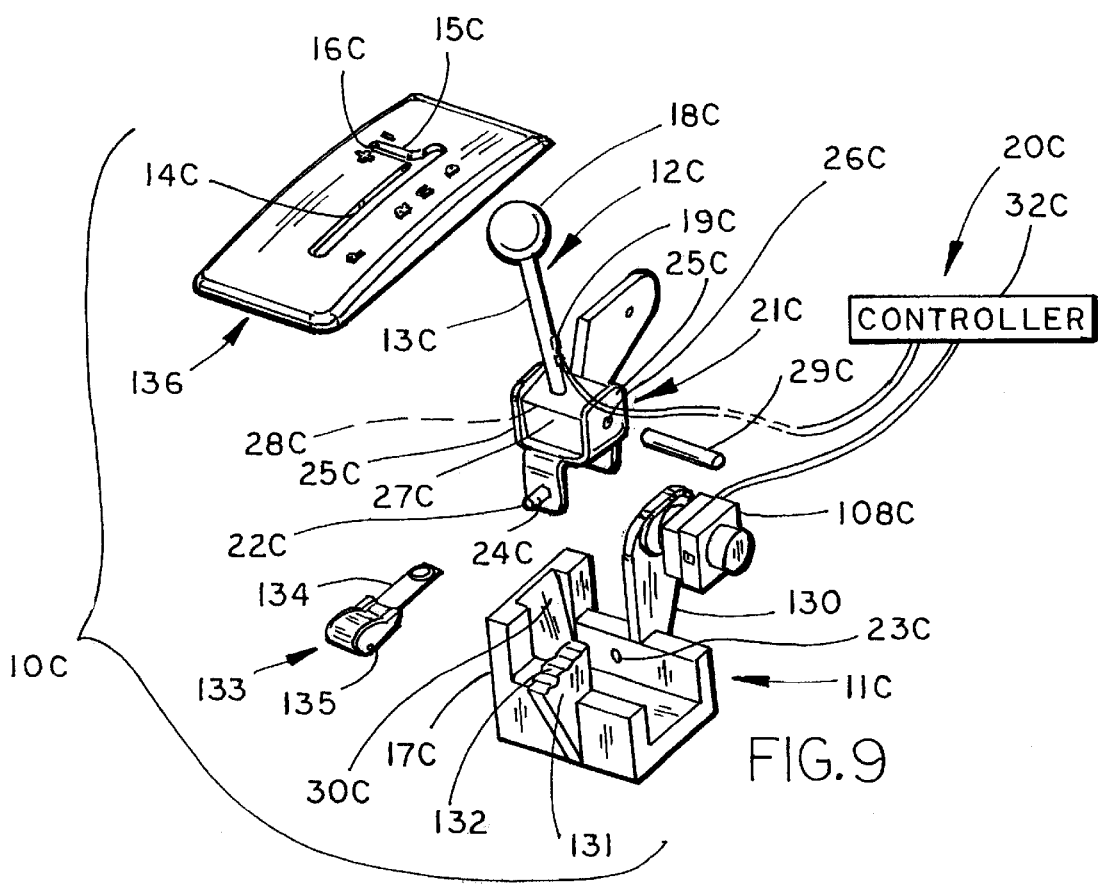
Figure 10:
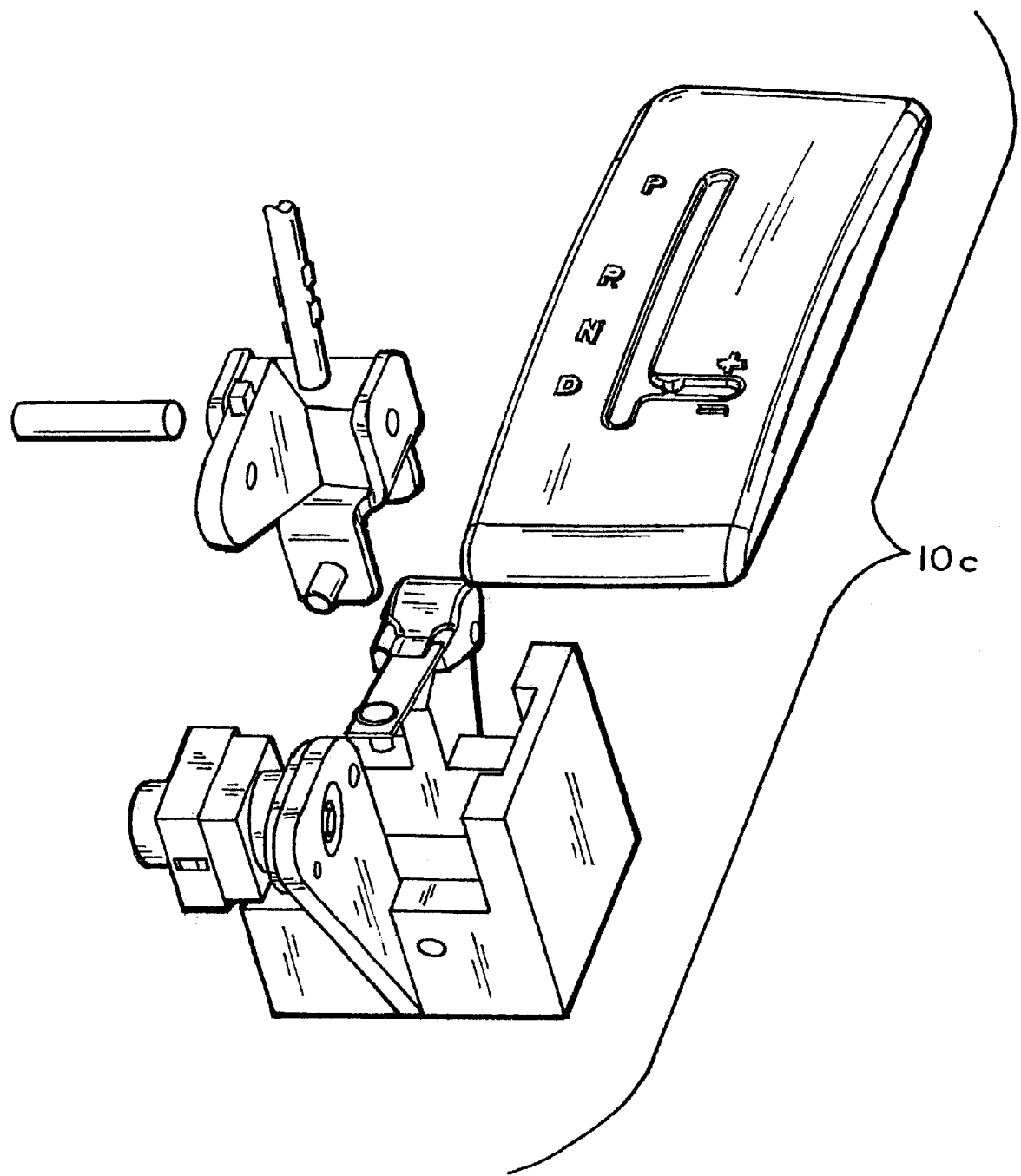

A shifter 10C (FIGS. 7–10) includes components and functions that are identical or similar to the shifter 10 (FIG. 1). Identical numbers are used to identify the comparable components and functions, but with the addition of the letter "C", including components 11C–30C and 32C. Also shown in FIG. 9 are the solenoid mounting flange 130, the solenoid/electromechanical device 108C, the flange 131 with undulated surface 132, the feel positioner 133' including leaf-spring arm 134 and roller 135 rollingly engaging surface 132, and cover 136. The cover 136 includes a slot 14C defining gear positions P, R, N, D, and also a transverse slot 15C for leading to an upshift/downshift position 16C.

Thus, a shifter is provided with sensors to measure loading without substantial movement of the driver interface module, such as a shift lever. A circuit is connected to the sensors and programmed to be reactive to load-based outputs, with the circuit outputting transmission-shift control signals when the sensors output a signal having a predetermined minimum value. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shifter comprising:
    a base;
    a driver interface module including a structural member attached to the base and operably held so that a handle on the structural member can be grasped and loaded by a vehicle operator;
    at least one load-measuring sensor attached to the structural member, the sensor outputting an analog signal in proportion to the load applied to the structural member by the vehicle operator; and
    a circuit connected to the load-measuring sensor for receiving the analog signal, the circuit being configured and programmed to output a transmission-shift control signal when the analog signal reaches a predetermined minimum load value, the circuit including a controller operably connected to the sensor and programmed to output the transmission-shift control signal; and wherein the controller is programmed to take a time derivative of the analog signal and generate the transmission-shift control signal based on the time derivative.

2. The shifter defined in claim 1, wherein the load-measuring sensor includes a strain gage.

3. The shifter defined in claim 2, wherein the strain gage is a surface-mounted strain gage.

4. The shifter defined in claim 3, wherein the structural member includes an elongated post and the handle is mounted atop the post.

5. The shifter defined in claim 4, wherein the post includes an enlarged bottom pivoted to the base, but movable in a transverse direction to a position where the post engages a stop member shaped to prevent movement along the phantom shift path but that allows loading in the direction parallel the phantom shift path.

6. The shifter defined in claim 1, wherein the structural member includes a dialable knob, and the handle includes a grip surface on the knob.

7. The shifter defined in claim 1, wherein the circuit includes a noise-generator for generating audible feedback to the vehicle operator when a transmission-shift control signal is generated.

8. A shifter comprising:
    a base configured for secure attachment to a vehicle;
    a driver interface module including a structural member operably attached to the base and adapted to be grasped by a vehicle operator, the structural member being movable along a first shift path between park, reverse, neutral, and drive gear positions, and further being positionable in a manual shift position where the structural member is characteristically not movable;
    at least one load-measuring sensor attached to one of the structural member and the base, the sensor outputting an analog signal when the structural member is in the manual shift position and loaded by the vehicle operator, the analog signal being proportional to the load applied to the structural member by the vehicle operator; and a circuit connected to the load-measuring sensor for receiving the analog signal, the circuit being configured and programmed to analyze the load application to the structural member with respect to time and control gear change characteristics of the vehicle's transmission in response to that analysis, the circuit including a controller operably connected to the sensor and programmed to output the transmission-shift control signal; and wherein the controller is programmed to take a time derivative of the analog signal and generate the transmission-shift control signal based on the time derivative.

9. The shifter defined in claim 8, wherein the load-measuring sensor includes a strain gage.

10. The shifter defined in claim 9, wherein the strain gage is a surface-mounted strain gage.

11. The shifter defined in claim 10, wherein the structural member includes an elongated post and the handle is mounted atop the post.

12. The shifter defined in claim 11, wherein the base includes a stop member, and wherein the post includes an enlarged bottom pivoted to the base, but movable to engage the stop member so that the post is securely held and prevented from movement along a fore/aft direction.

13. The shifter defined in claim 8, wherein the structural member includes a dialable knob, and the handle includes a grip surface on the knob.

14. A shifter for shifting a vehicle transmission, comprising:

a base defining an arcuate track and defining a virtual pivot axis below the track;

a carrier operably mounted to the arcuate track for movement along the track around the virtual pivot axis; and a driver interface module supported by the carrier and including an automatic shift mode and a manual shift mode, the driver interface module when in the automatic shift mode having selectable positions corresponding to park, reverse, neutral, and drive gear positions in an automatic transmission, and when in the manual shift mode having at least one position where upshifting and downshifting of the automatic transmission can be accomplished manually.

15. The shifter defined in claim 14, including an electromechanical device for holding the carrier in a stationary position when the driver interface module is in the manual shift mode.

16. The shifter defined in claim 15, wherein the electromechanical device includes an extendable pin configured to engage and hold the carrier in the stationary position when the driver interface module is in the manual shift mode.

* * * * *